US008996231B2

(12) United States Patent
Uratani et al.

(10) Patent No.: US 8,996,231 B2
(45) Date of Patent: Mar. 31, 2015

(54) TEST SYSTEM

(71) Applicant: Horiba, Ltd., Kyoto (JP)

(72) Inventors: Katsumi Uratani, Kyoto (JP); Koji Watanabe, Kyoto (JP); Hiroshi Nakamura, Kyoto (JP); Tsutomu Misogi, Kyoto (JP)

(73) Assignee: Horiba, Ltd., Kyoto (JP)

( * ) Notice: Subject to any disclaimer, the term of this patent is extended or adjusted under 35 U.S.C. 154(b) by 0 days.

(21) Appl. No.: 13/901,734

(22) Filed: May 24, 2013

(65) Prior Publication Data
US 2013/0317689 A1    Nov. 28, 2013

(30) Foreign Application Priority Data

May 24, 2012  (JP) ................................. 2012-118185
May 24, 2012  (JP) ................................. 2012-118186

(51) Int. Cl.
| *G01M 15/05* | (2006.01) |
| *G01M 15/10* | (2006.01) |
| *G01M 17/00* | (2006.01) |

(52) U.S. Cl.
CPC .............. *G01M 17/00* (2013.01); *G01M 15/10* (2013.01); *G01M 15/05* (2013.01)
USPC ..... 701/29.1; 701/31.4; 701/34.3; 73/116.05; 73/114.71

(58) Field of Classification Search
None
See application file for complete search history.

(56) References Cited

U.S. PATENT DOCUMENTS

| 6,516,656 | B1 * | 2/2003 | Jetter et al. ................. 73/114.71 |
| 7,272,476 | B2 * | 9/2007 | Ortiz et al. .................... 701/34.3 |
| 7,350,159 | B2 * | 3/2008 | Cancilla et al. ............... 715/854 |
| 7,454,950 | B2 * | 11/2008 | Nakamura .................... 73/23.31 |
| 8,429,957 | B2 * | 4/2013 | Stedman ..................... 73/114.71 |
| 2011/0169836 | A1 | 7/2011 | Orihashi et al. |
| 2013/0325248 | A1 * | 12/2013 | Uratani et al. .............. 701/31.4 |

FOREIGN PATENT DOCUMENTS

| FR | 2931944 | * 12/2009 |
| JP | 08-063223 | 3/1996 |
| JP | 2000-090057 | 3/2000 |
| JP | 2003-211799 | 7/2003 |
| JP | 2004-318762 | 11/2004 |
| JP | 2005-037162 | 2/2005 |
| JP | 2005049353 | 2/2005 |

(Continued)

OTHER PUBLICATIONS

Takashi Nagano, Takuji Osaki, Horiba's Approach to a Advanced ULEV Measurement System, Readout, No. 19, Mar. 1999, pp. 11-13.

(Continued)

*Primary Examiner* — Michael J Zanelli
(74) *Attorney, Agent, or Firm* — Brooks Kushman P.C.

(57) ABSTRACT

An administrating device that administrates a plurality of units for test used for a test of a mobile object such as a vehicle or a constituting component of the mobile object comprises a recognizing part that recognizes an assembly of one or more units for test as a group for test and an assembly of one or more group for test as a device for test, and an administrating body part that conducts a predetermined batch operation command or a predetermined batch setting for a unit for test that belongs to the designated one or more groups for test and/or that conducts a predetermined batch operation command or a predetermined batch setting on a unit for test that belongs to the designated one or more device for test.

16 Claims, 14 Drawing Sheets

(56) References Cited

FOREIGN PATENT DOCUMENTS

| JP | 2006-106974 | 4/2006 |
| JP | 2010-249757 | 11/2010 |
| JP | 2012-038044 | 2/2012 |
| JP | 2012-093326 | 5/2012 |
| WO | 2010-027037 A1 | 3/2010 |

OTHER PUBLICATIONS

Hiroshi Kawamura, Automotive Development and Progress in Horiba's Emission Measurement Technologies, Readout, No. 34, Jan. 31, 2009, pp. 44-49.

\* cited by examiner

TEST SYSTEM

CROSS-REFERENCE TO RELATED APPLICATIONS

This application claims priority to JP Application No. 2012-118185, filed on May 24, 2012, and JP Application No. 2012-118186, filed on May 24, 2012, the disclosures of which are incorporated in their entirety by reference herein.

FIELD OF THE ART

This invention relates to a test system for testing a mobile object itself such as a vehicle, a ship or an airplane, and a component such as an internal combustion engine used for the mobile object.

BACKGROUND ART

Conventionally known is, an automobile test system wherein a plurality of measurement devices are connected to a single measurement administrating device and the measurement devices are controlled by the administrating device. In addition, as shown in Japanese Unexamined Patent Application Publication No. 2005-49353, a test automatic administrating device is arranged above the administrating device and a test schedule is determined by the test automatic administrating device.

For the test system, it is possible to verify an operation status of each measurement unit by means of a screen of a display that displays measurement data or correction information output by the measurement unit. In this case, each of the measurement data or correction information is displayed on the corresponding window respectively in every measurement unit. It is possible for an operator to conduct various sorts of setting or operation command (for example, setting a span gas concentration value, a measurement operation initiation command or the like) from an administrating device to each measurement unit by remote control.

DISCLOSURE OF THE INVENTION

Problems to be Solved by the Invention

However, with the conventional arrangement, since it is necessary to conduct the above-mentioned setting or operation command in every unit for measurement respectively, it becomes complicated to operate the test system using a plurality of units for measurement.

In addition, when a number of the measurement unit becomes multiple, it becomes difficult to immediately grasp the operation status of each unit for measurement because a window indicating an operation status of some of the units for measurement is hidden or every single window becomes small. In addition, in case that one of the windows is displayed in, for example, a maximum size, since other windows are hidden by the maximized window, it becomes difficult to verify the information, namely the operation status, of the device for measurement corresponding to the above-mentioned other windows at once.

It is considered that these problems are common not only to the test system using the unit for measurement but also to the test system using the unit for test to test the mobile object or the component constituting the mobile object.

The present claimed invention is to solve these problems and a main object of this invention is to provide a test system that can be operated flexibly by easily conducting various sorts of setting or operation commands to a plurality of units for test and that can be easily grasp the operation status of all of the units for test.

Means to Solve the Problems

More specifically, a test system in accordance with this invention is to test a mobile object such as a vehicle, a ship or an airplane, or a component of the mobile object, and is characterized by that one or a plurality of units for test used for the test and an administrating device that administrates the unit for test are comprised, and the administrating device comprises a recognizing part that recognizes an assembly of one or more units for test as a group for test and an administrating body part that conducts a predetermined batch operation command or a predetermined batch setting on every one or more designated groups for test.

It is more preferable that the recognizing part recognizes an assembly of one or more groups for test as a device for test, and the administrating body part conducts the predetermined batch operation command or the predetermined batch setting on the unit for test that belongs to one or more designated devices for test.

In accordance with this arrangement, since the batch operation command or the batch setting can be conduced while a systematic relation of each unit for test is grasped, it is possible to make the operation easier to understand and to prevent a selection error of the device for test.

In order to make it possible to operate the system further more flexibly, it is preferable that the above-mentioned batch operation command or the above-mentioned batch setting can be conducted on except for some of the units for test that belong to the above-mentioned group for test, or the above-mentioned device administration can be conducted on except for some of the groups for test or the units for test that belong to the above-mentioned device for test.

As a concrete embodiment of the recognizing part represented is that comprises a memory part that stores hierarchical structure data where a device ID indicating the device for test locates in an upper hierarchy, a group ID indicating the group for test and a unit ID indicating the unit for test are positioned in this order in a lower hierarchy than that of the device ID.

In order to make it possible to conduct the system administration without being tethered by a hardware configuration or in compliance with a change of a hardware configuration, it is preferable that the administrating device further comprises a receiving part that receives addition, change or deletion of the group for test or the device for test that is recognized by the above-mentioned recognizing part, and that reflects the addition, change or deletion in the memory part.

More preferably represented is that the receiving part also receives a change from a predetermined unit for test to the device for test, or a change from a predetermined device for test to the unit for test.

In order to make it possible to share a content of the batch operation command or a content of the batch setting among the administrating body parts, it is preferable to further comprise a communicating part that transmits a content of the batch operation command or a content of the batch setting of one of the administrating body parts to the other administrating body part.

As a concrete embodiment to produce the effect of this invention more conspicuously represented is that the unit for test is a unit for measurement used for measuring a gas flowing in an air intake and exhaust path of an internal combustion engine, and an assembly of the units for measurement to measure a gas at a predetermined sampling point arranged on the air intake and exhaust path is recognized as the group for test.

In addition, a test system in accordance with this invention is a test system to test an object to be tested with a mobile object such as a vehicle, a ship or an airplane, or a component used for the mobile object being as the object to be tested, and comprises one or a plurality of devices for test used for the test and a device administrating device that is connected to the devices for test in a communicable manner and that administrates the devices for test, and is characterized by that the device administrating device has a display part that obtains information output by the device for test and that displays the obtained information in an erasable manner, a switchable manner or a movable manner on a display, and the display part preferentially displays an operation status icon whose mode changes in accordance with the operation status of the device for test irrespective of the display of the information.

In accordance with this arrangement, the display part displays the operation status icon in either case that various information output by the device for test is displayed, no information is displayed or the information is moved inside of the display. Accordingly, even though a case that the information from the device for test is not displayed, or it is difficult to recognize the information because other display content overlaps the information, it becomes possible to verify under what operation status the device for test is just by verifying the operation status icon.

In other words, since the display part preferentially displays the operation status icon whose mode varies in accordance with the operation status of the device for test irrespective of the display of the information, it is possible to verify the operation status of the device for test as needed during operation of the test system without any operation.

"The mode changes" in this invention includes a visual change of the operation status icon by changing a shape, a size, a color, a drawing pattern or a picture, a character, a lighting state (brightness, blinking) or the like of the operation status icon displayed in the displaying part by itself or in combination.

In order to improve the recognizability by displaying the operation status icon only to the device for test connected to the device administrating device, it is preferable that the device administrating device further comprises a connection operation detecting part that detects that a connection or disconnection operation to connect or disconnect the device for test is conducted, and an operation status icon is not displayed for the device for test for which the disconnection operation is detected by the connection operation detecting part.

In accordance with the above-mentioned arrangement, as the device for test represented is a device for measurement used for measuring an exhaust gas of an internal combustion engine. Concretely, as the device for measurement represented is the device for measurement that is arranged in an exhaust gas path of the internal combustion engine and measures the exhaust gas flowing in the exhaust gas path.

Effect of the Invention

In accordance with this invention, since it is possible for the operator to select a plurality of units for test to conduct the batch setting while grasping the systematic relationship of each unit for test by grouping the units for test, for example, in every content of setting in a hierarchical structure, a setting operation becomes more easy to understand. In addition, since it is possible to change an objet for batch operation command or batch setting just by changing the recognition of the recognizing part, it becomes possible to operate the test system flexibly.

BEST MODES OF EMBODYING THE INVENTION

A first embodiment of this invention will be explained with reference to drawings, and it is a matter of course that this invention is not limited to the following embodiment.

Figure 1:
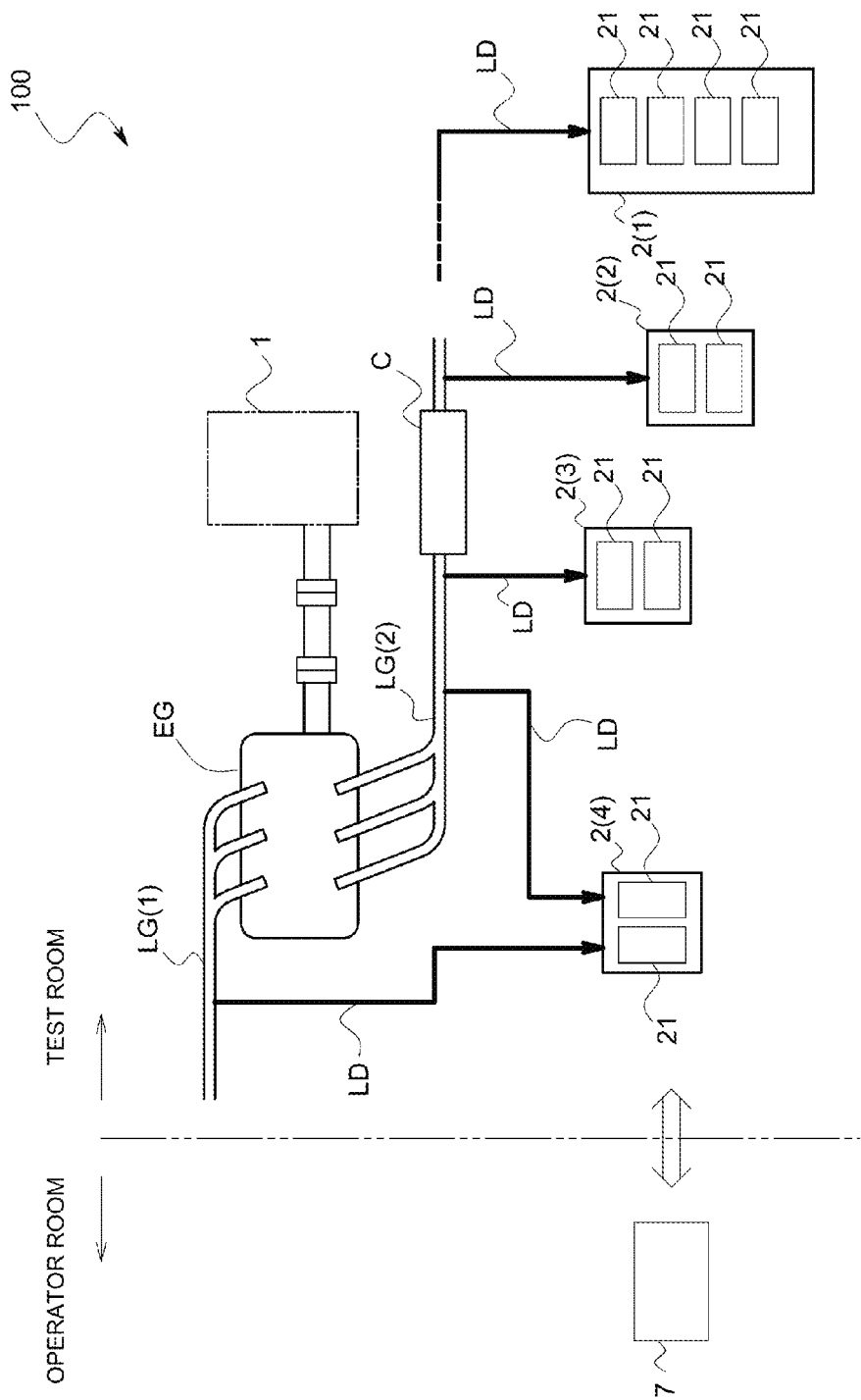
FIG. 1 is a pattern configuration diagram showing an overall of a test system in accordance with a first embodiment of this invention.

FIG. 1 schematically shows an overall view of a test system 100 in accordance with this embodiment. The test system 100 is to test an engine performance of a vehicle, and comprises a test automatic administrating device (not shown in drawings), a dynamometer 1 connected to an internal combustion engine (EG), a plurality of analysis devices 2 and a administrating device 7 or the like.

The analysis device 2 samples a gas from an air intake and exhaust path (LG) (if classification is required, an air intake side is denoted by (LG(1)) and an exhaust side is denoted by (LG(2))) of the internal combustion engine (EG) operated by a command from the above-mentioned test automatic administrating device, measures an amount of each component such as HC, $NO_x$, CO, $CO_2$ contained in the sampled gas and calculates a performance value of devices such as the internal combustion engine (EG) or a catalyst device (C) based on the measurement value.

Figure 2:
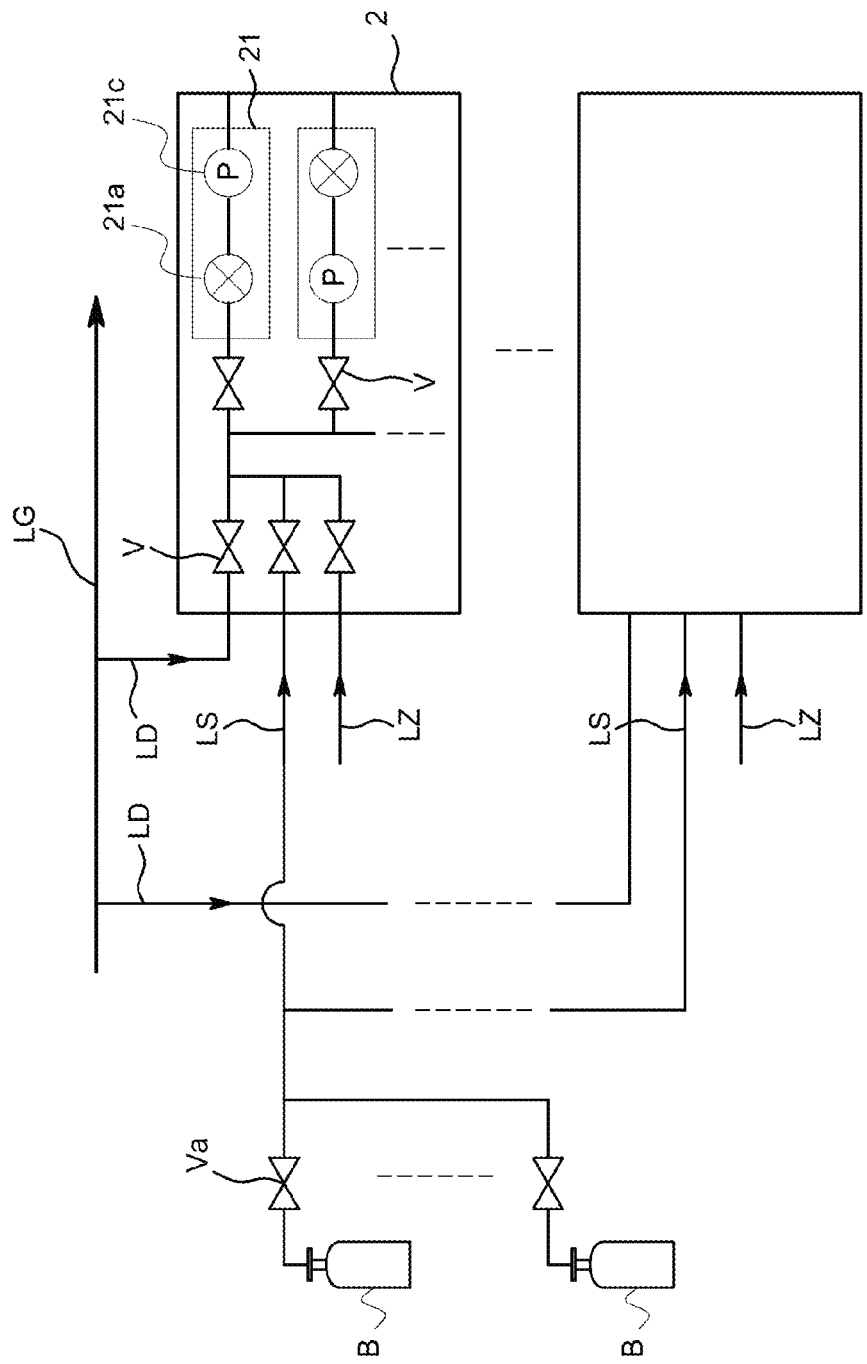
FIG. 2 is a fluid circuit diagram simply showing a gas flow channel of this embodiment.

In order to measure the amount of the component, each analysis device 2 is, as shown in FIG. 2, connected to a sampling pipe (LD) to sample the intake gas or the exhaust gas from the air intake and exhaust path (LG) of the internal combustion engine (EG). A point (a sampling point), where the sampling pipe (LD) is connected, on the air intake and exhaust pipe (LG) is set at a point, for example, before and after the internal combustion engine (EG), before and after the catalyst device (C) or a terminal part of the exhaust path (LG(2)). In FIG. 2, a code (LS) indicates a span gas introducing pipe to introduce the span gas for correction, a code (LZ) indicates a zero gas introducing pipe to introduce a zero gas for correction, and a code (V) indicates a valve to switch the gas.

The sampled gas is, as shown in FIG. 2, introduced into one or more analysis units 21 of each analysis device 2 and a concentration of a predetermined component is measured. In case that there is necessity of classifying the analysis devices 2, a parentheses is put.

The analysis unit 21 is, for example, an FID to measure THD, a CLD to measure $NO_x$, or an NDIR to measure CO, $CO_2$, and comprises a sensor 21a and its peripheral devices to measure a single gas component or the same kind of a gas component. The analysis unit 21 corresponds to a unit for test or a unit for measurement in claims.

Figure 3:
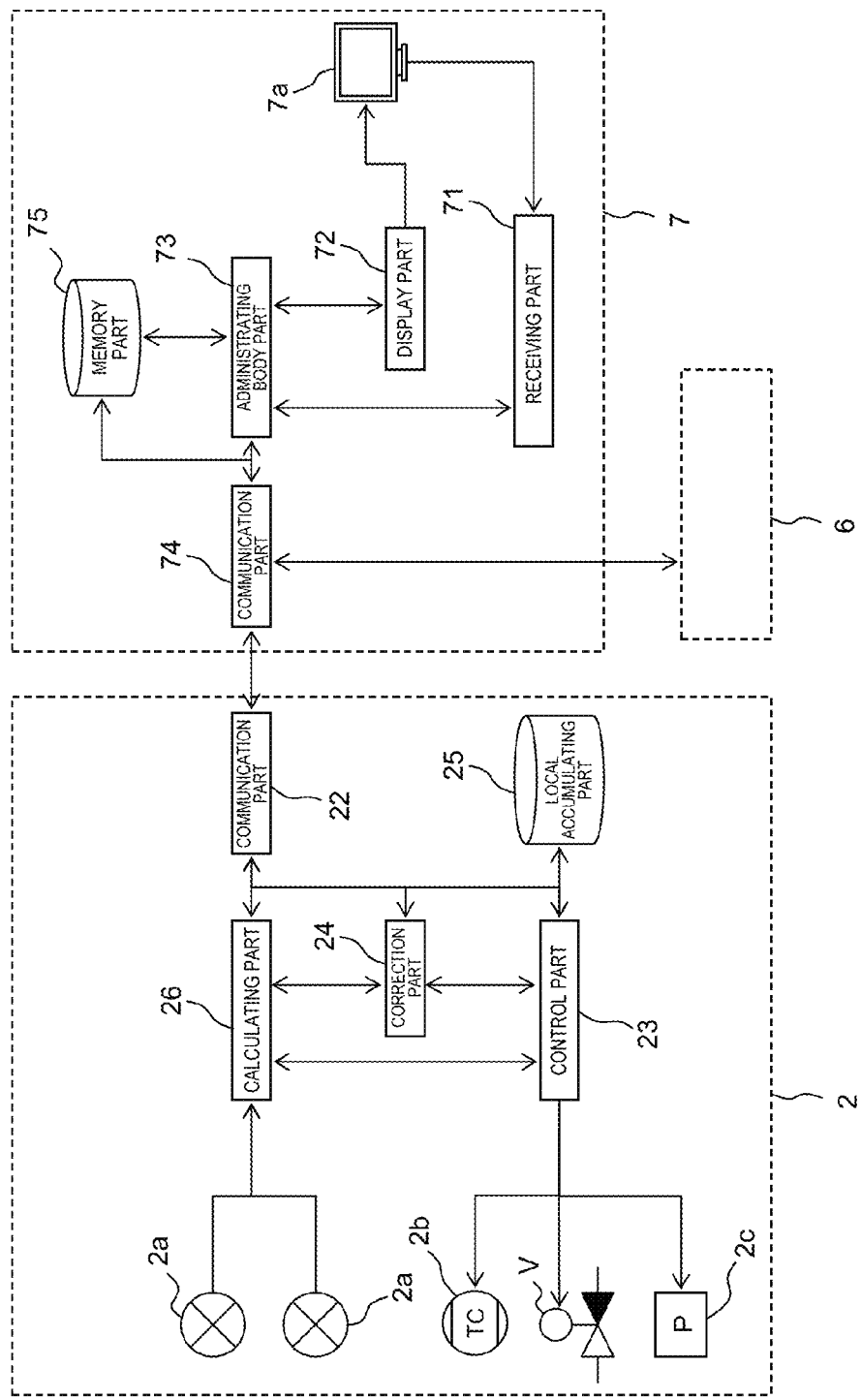
FIG. 3 is a functional block diagram of a device and a administrating device of this embodiment.

Furthermore, the analysis device 2 has a local computer. The local computer comprises, a CPU, a memory, an A/D converter and a communication interface, not shown in drawings. As shown in FIG. 3, the local computer produces both a function as a calculating part 26 that provides a predetermined calculation on a detected value output by the sensor 21a of each analysis unit 21, calculates a measurement value indicating each component amount and calculates the device performance value based on the measurement value, and a function as a communicating part 22 that transmits the measurement value or the device performance value calculated by the calculating part 26 to the administrating device 7 through a predetermined protocol by cooperating the CPU and its peripheral devices based on the programs stored in the memory. The local computer may be provided for each of the analysis devices 2 respectively, or a single local computer may be provided for a plurality of analysis devices 2. In this embodiment, the local computer acts with a device, to be described later, as a unit.

The local computer further comprises a control part 23 that receives a command signal from the administrating device 7 and controls the valve (V), the temperature adjusting mechanism 21b, and the pump 21c so as to control an operation mode (a measurement mode, a correction mode, a purge mode or the like), or a state mode (a sleep mode, a pose mode, a standby mode or the like) of the analysis device 2, a correcting part 24 that provides a correction on the measurement value by the calculating part 26 or an arithmetic expression for measuring the performance value so as to correct the sensor 21a, or a local accumulating part 25 that sequentially obtains state information of the analysis device 2 ranging from the past to the present and accumulates the obtained state information.

The administrating device 7 is configured by installing predetermined programs on, for example, a general purpose computer, and comprises a CPU, a memory, a display, an input device (a keyboard or a mouse) and a communication interface. As shown in FIG. 3, the administrating device 7 produces functions as a receiving part 71, a display part 72, an administrating body part 73, a communication part 74 and a memory part 75 by cooperating the CPU and its peripheral devices based on programs stored in the memory. A communication port is provided for the administrating device 7, and the analysis device 2 is connected to the administrating device 7 in an inter-communicable manner by wire or wireless.

In the memory part 75 stored is data that is classified into a group (corresponds to a group for test in claims) consisting of one or more analysis units 21 and a device (corresponds to a device for test in claims) consisting of one or more groups with the analysis unit 21 as the smallest unit.

Figure 4:
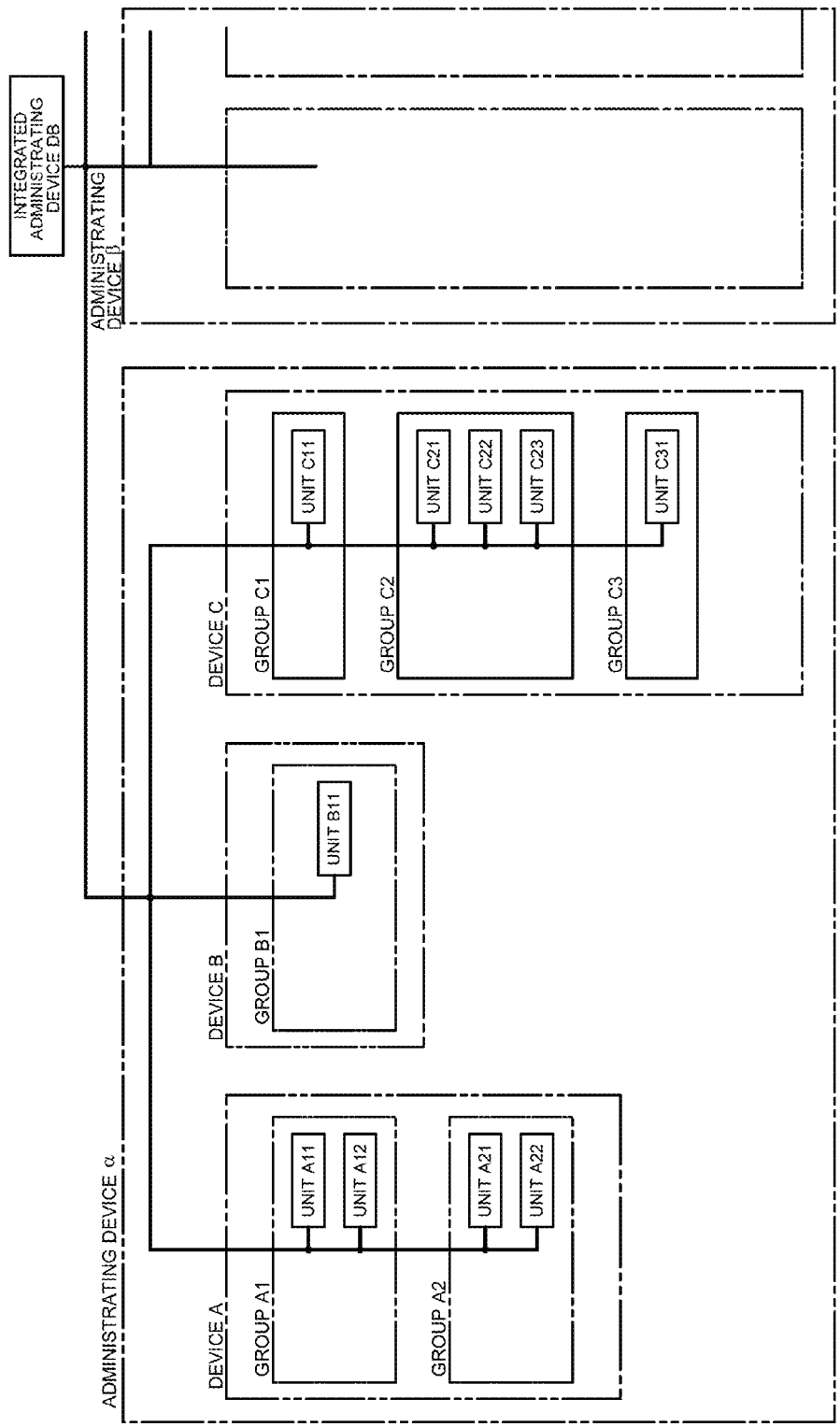
FIG. 4 is both a pattern diagram showing a data hierarchical structure and a screen general configuration diagram showing an outline of a screen displayed when setting is batch designated.

More specifically, as schematically shown in FIG. 4, in this memory part 75 stored is a tree structured hierarchy structure data where a device hierarchy to which a device ID indicating the device belongs, in a lower level hierarchy of which a group hierarchy to which a group ID indicating the group belongs and in a lower level hierarchy of which a unit hierarchy to which a unit hierarchy to which a unit ID indicating the unit belongs are formed.

Fundamentally, a single analysis device 2 corresponds to a single device, and a group locating in a lower level of the hierarchy of the analysis device 2 comprises one or more analysis units, however, since the group and the device are classified arbitrarily from the viewpoint of usability for a user, control or functionality, there are some cases wherein the group and the device do not correspond one-to-one in a physical layout. More specifically, there is a case that a plurality of devices correspond to a single analysis device 2, or a single device corresponds to a plurality of analysis devices 2. In addition, its variation ranges over variously such that there is a case that a single group comprises a plurality of analysis units 21 each of which belongs to a plurality of different analysis devices 2.

However, this embodiment makes it condition that each of the group and the device is of a physical layout that can act independently as a unit (for example, a pump is comprised and the gas can be sampled independently or the like).

Furthermore, in this embodiment, the analysis units 21 that act for a common purpose are set as one group. The common purpose is, for example, a component analysis of an exhaust gas at a predetermined sampling point of the air intake and exhaust path (LG), or a measurement of a predetermined performance (for example, an EGR ratio, an exhaust gas flow rate or the like) of the internal combustion engine (EG).

Concretely, for example, a family of analysis units that measure a gas flowing in an terminal end part (tail pipe) of the exhaust path (LG(2)) is registered in the memory part 75 as a "Tail Pipe" group. Speaking in relationship with the physical devices, the analysis device 2(1) and the analysis device 2(2) in FIG. 1 belong to the "Tail Pipe" group.

Other example is that a family of the analysis units connected to the upstream of the catalyst device (C) is registered in the memory part 75 as a "Pre CAT" group. Speaking in relationship with the physical devices, the analysis device 2(3) in FIG. 1 belongs to the "Pre CAT" group. Since the gas sampled from the upstream of the catalyst device (C) is also introduced into the analysis unit that is a part of the analysis device 2(1), a part of the analysis device 2(1) belongs to the "Pre CAT" group.

Furthermore, for example, a family of the analysis units that measures a gas sampled in an upstream and a downstream of the internal combustion engine (EG) is registered in the memory part 75 as an "EGR" group. Speaking in relationship with the physical devices, the analysis device 2(4) in FIG. 1 belongs to the "EGR" group (expressed as "group 1" in FIG. 6, to be described later).

In this embodiment, a unit of the device and the group is not necessarily the analysis unit, and a device used for measurement, for example, although not shown in drawings, an operation unit (PSU, ESU, CSU or the like) of CVS that conducts a preprocessing of the measurement is also configured as the unit.

In addition, in this embodiment, as shown in FIG. 4, an administrating device hierarchy is provided in an upper hierarchy of the device hierarchy, and an integrated administrating device hierarchy is provided in a further upper hierarchy of the administrating device hierarchy. This is based on a physical configuration wherein a plurality of administrating devices 7 are administrated by the integrated administrating device.

Next, an operation of the test system 100 having the above-mentioned arrangement in case that a predetermined operation is batch-commanded or a predetermined setting is batch-conducted on the analysis device (or the device) by the use of the administrating device 7 will be explained.

Figure 5:
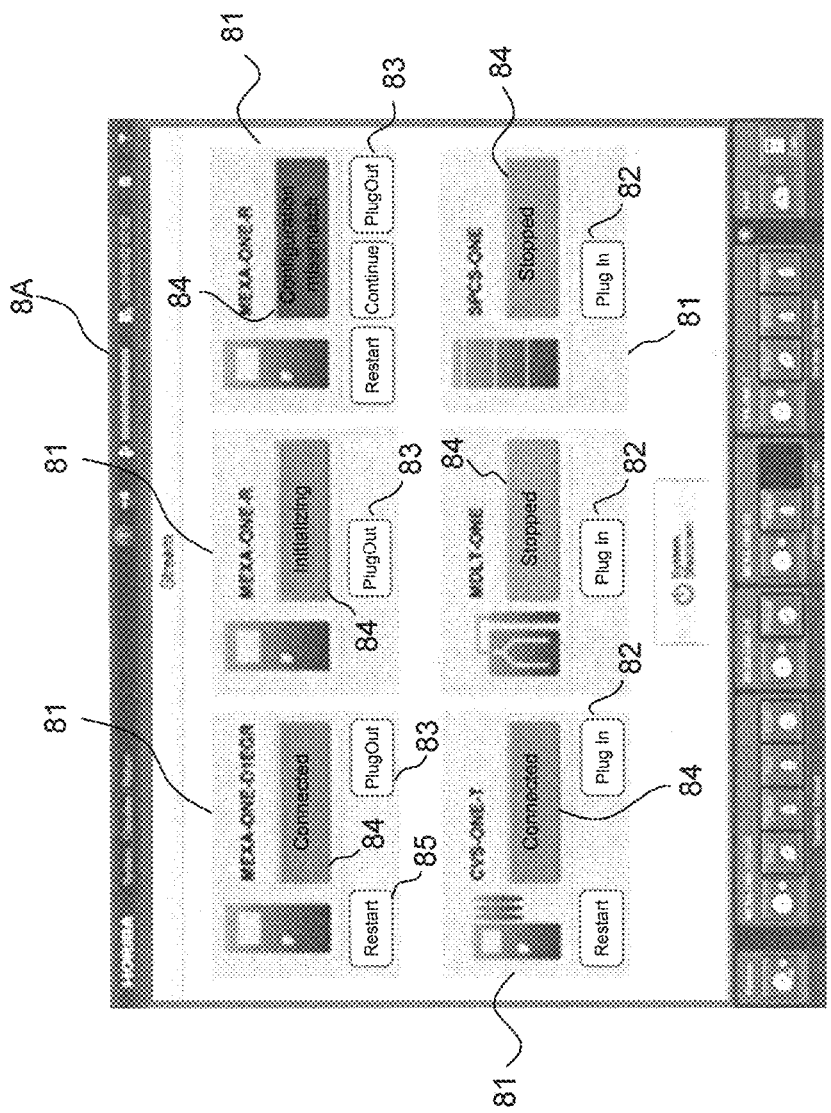
FIG. 5 is a screen configuration diagram showing an initial screen of this embodiment.

First, the batch operation command will be explained, however, an initial screen as being a precondition of the batch command is displayed. A screen (hereinafter also called as a plug-in screen) 8A as shown in FIG. 5 is displayed as the initial screen on the display 7a of the administrating device 7 by the function of the display part 72. A plurality of device signs 81 indicating the preliminary registered devices are arranged so as not to be overlapped each other. Each of the device signs 81 is in a rectangular shape, and a connection button 82 to be connected to the device, a disconnection button 83 to disconnect the connection of the device and a connection state indicating area 84 to indicate a state of connection are provided in addition to a schematic view indicating a pertinent device.

When an operator clicks, for example, the connection button 82 on the plug-in screen 8A, exchange of a communication with the communicating part 22 of the pertinent device is initiated. If a predetermined protocol is terminated in an orderly manner and an inter-communicable connecting state is established, a "Connected" indicating a state of being connected in a communicable manner is displayed in the connection state display area 84 in the pertinent device sign 81.

Meanwhile, when the disconnection button 83 is clicked in this connected state, the exchange of the communication with the pertinent device is blocked and a "Stopped" indicating a state that the connection is released is displayed in the connection state display area 84.

Figure 6:
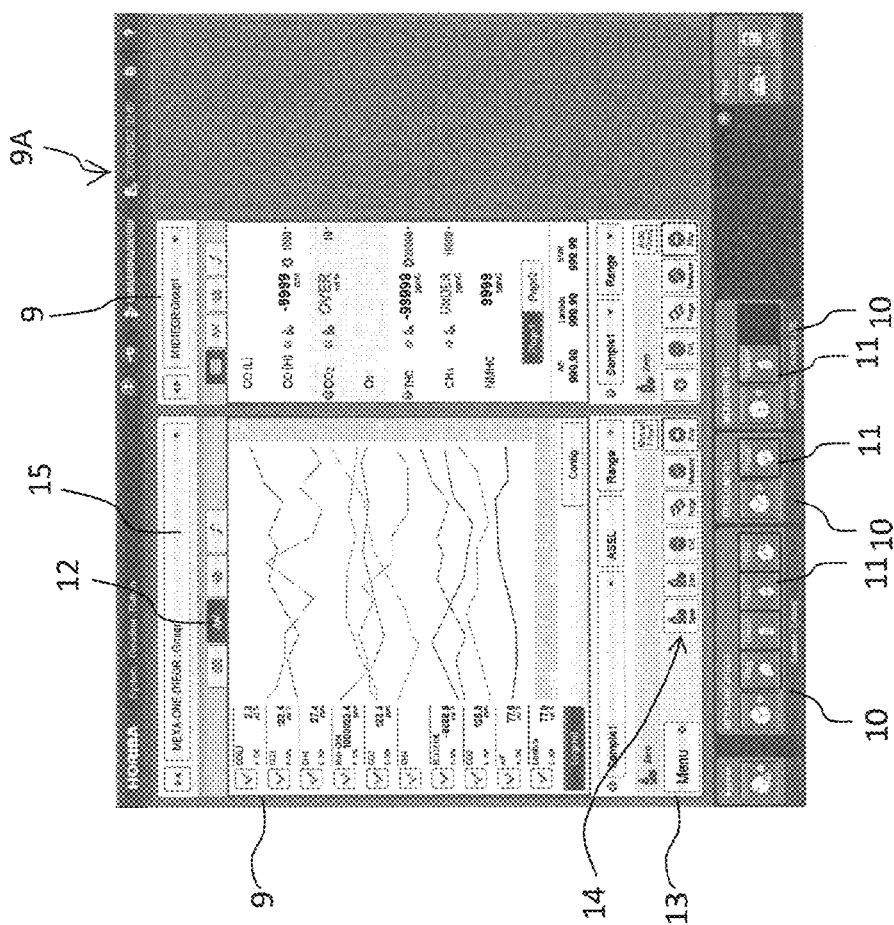
FIG. 6 is a screen configuration diagram displayed when a batch operation command is designated of this embodiment.

As mentioned, when the necessary device is connected to the administrating device 7 in a communicable manner and a predetermined operation is executed, the display part 72 displays a detailed information display screen 9A as shown in FIG. 6 on the display 7a. The detailed information display screen 9A displays the measurement data of the device or varieties of information in an operating mode (a measurement mode, a correction mode, a purge mode or the like) or a state mode (a sleep mode, a stand-by mode or the like).

In this detailed information display screen 9A, a device panel window 9 that displays the correction data or the measurement data corresponding to varieties of information output from each device is displayed by a graph or a numerical value by the display part 72, and an operation status icon 11 is displayed in an operation status icon area 10 arranged on the lower side of the display part 72.

A pull-down menu 15 to select the group that belongs to this device is arranged in the display panel window 9, and the measurement data from each analysis unit 21 that belongs to the group selected in the pull-down menu 15 is displayed. The displayed mode can be switched to the graph or the numerical value by clicking a display mode switch button 12.

A plurality of operation buttons 14 are arranged in the lower side of the device panel window 9. When the operator clicks either one of the operation buttons 14, the receiving part 71 receives the operation and the administrating body part 73 specifies each analysis unit 21 that belongs to the group selected in the device panel window 9 by referring the memory part 75, and an operation indicated by a design of the operation button 14 is batch-designated to each analysis unit 21.

Figure 7:
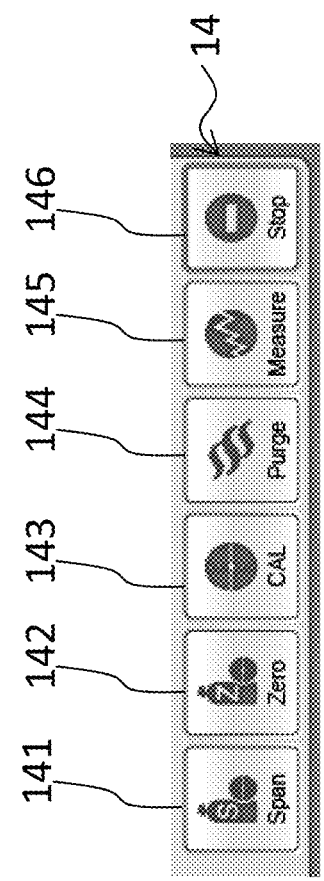
FIG. 7 is an enlarged view of an operation button to issue a batch operation command of this embodiment.

Detail of the operation button 14 is shown in FIG. 7. When the operation button 141 indicated in "Span" is clicked, an operation of introducing a span gas is designated to the device or the group for measurement indicated in the corresponding device panel window 9. Similarly, in case of the operation button 142 of "Zero", the zero gas is introduced. In case of the operation button 143 of "CAL", an operation of executing a calibration is designated based on the measurement result of the introduced span gas and the zero gas. In case of the operation button 144 of "Purge", an operation of executing cleaning up the gas in the device is designated. In case of the operation button 145 of "Measure", an operation of executing the measurement of the sampled gas is designated. In case of the operation button 146 of "Stop", an operation of ceasing the measurement is designated.

An object of the batch operation command can be selected from the pull-down menu 15. More specifically, not only the group but also the device arranged in the upper hierarchy of the group, and the administrating device and the integrated administrating device arranged in the further upper hierarchy can be selected, and also the object can be selected by a unit of the analysis unit 21. When the operation of selection is conducted, the operation to all of the analysis units 21 in the lower hierarchy is designated based on the hierarchy data stored in the memory part 75. Although not shown in drawings, either of the unit, group and device may be removed among the object to be batch-designated by the operation of the operator.

Next, an operation of the batch-setting will be explained with an example of the setting operation in accordance with the span correction.

As shown in FIG. 2, in case of the span correction, first a span gas supply source (B) (a steel bottle or a syringe) whose concentration is known is connected to the span gas introducing pipe (LS) by operating an valve (Va) or the like.

Since the concentration of the span gas of the span gas supply source (B) is slightly different in every individual product in spite of the same kind, it is necessary for the operator to input an accurate concentration described on the span gas supply source (B) into the administrating device 7 every time the span gas supply source (B) is exchanged.

Figure 8:
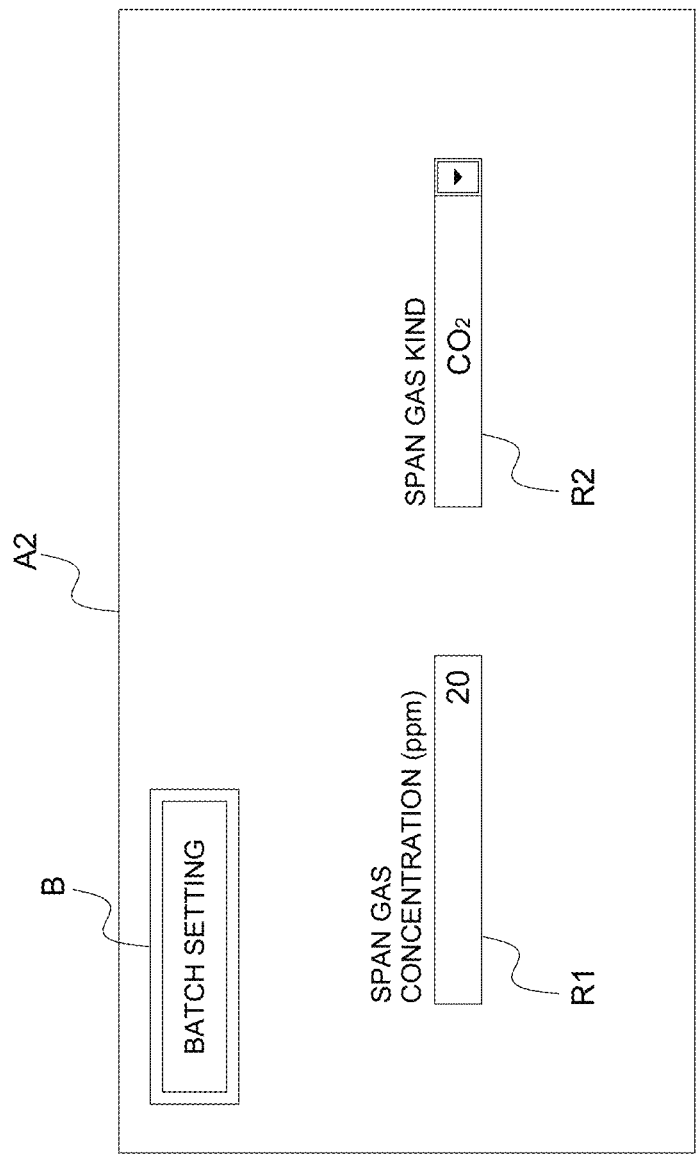
FIG. 8 is a setting value input screen to input a correction setting value of this embodiment.

Then, the operator conducts an appropriate operation so that the administrating device 7 displays the correction setting screen A1 shown in FIG. 8. Sections R2 and R1 to input the kind of the span gas and the concentration of the span gas are provided, and a shift button B1 to shift the screen to a batch designation screen A2 to designate the analysis device 2 to be batch-set is provided for this correction setting screen A1.

A diagram indicating a hierarchical structure stored in the memory part 75, as shown in, for example, FIG. 4, is illustrated together with the group ID or the device ID on the batch designation screen A2.

Then, when the operator operates to designate an ID (for example, the group A1 in this embodiment) of an arbitrary group, the analysis unit 21 that belongs to the group, in other words, resulting in that all of the analysis units 21 locating in the hierarchical structure lower than the group are selected. In addition, when the ID (a section of the "administrating device (A)" in this embodiment) of the relevant administrating device is designated by being clicked, the group, in other words, all of the analysis units 21 administrated by the administrating device 7 are selected and a display of the selected part changes to be distinguishable from others. In addition, when the ID section (a section of "DB" in this embodiment) of the integrated administrating device is selected, all of the analysis units 21 are selected.

With this state kept, when a decision button, not shown in drawings, is clicked, the receiving part 71 receives the span gas concentration as being its set content together with the group designation, and the administrating body part 73 batch-transmits the span gas concentration to the device (or the analysis device 2) including each of the selected analysis units 21.

The local computer of the measurement device (or the analysis device 2) that receives the span gas concentration and the command corrects the value of the span gas concentration used for correction or the correction formula for computation using the value of the span gas concentration used by the correcting part 24 and stores the corrected value or the corrected formula for computation in the local accumulating part 25.

The above-mentioned is the setting operation. Furthermore, in this embodiment, it is possible to designate the group other than the group designated in the above-mentioned batch designation screen shown in FIG. 4, and it is also possible to cancel a designation of the device that belongs to the designated group or the group in the lower hierarchy. For example, in the hierarchical structure drawing displayed in the batch designation screen, when a predetermined operation is conducted so as to connect a group and a line that is connected to the group, a batch setting to the group and the device connected to the line can be conducted. When a predetermined operation is conducted so as to disconnect a line in the designated group, no batch setting is conducted for the group or the device after the disconnected line.

It is a matter of course that it is possible to conduct not only the span setting but also a setting of the quality check item or a setting of a quality check period such as an operation of the analysis device 2, or a setting of an allowable operation hours of a component constituting the analysis device 2 by batch. At this time, grouping or a hierarchical structure accompanying the grouping may be made different for each setting content.

The present claimed invention is not limited to the above-mentioned embodiment. For example, the group or the hierarchical structure is not limited to a unit of the administrating device 7. For example, the analysis units 21 of the same kind incorporated in different administrating devices 7 may be set as one group in view of the administration. The display mode of the screen may be variously modified, and the above-mentioned correction setting screen and the batch designation screen may be displayed simultaneously on the display. In addition, this test system may be applied to a test of, for example, a vehicle, and may be used for a test of an airplane or a ship, or its devices. As an object to be set is not limited to the analysis device 2 (device for test). In case that there are a plurality of devices of the same kind to be the object to be tested, the specification of the devices may be set by batch. The present claimed invention may be various modified without departing from the spirit of the invention.

<Second Embodiment>

A second embodiment of this invention will be explained with reference to drawings.

Figure 9:
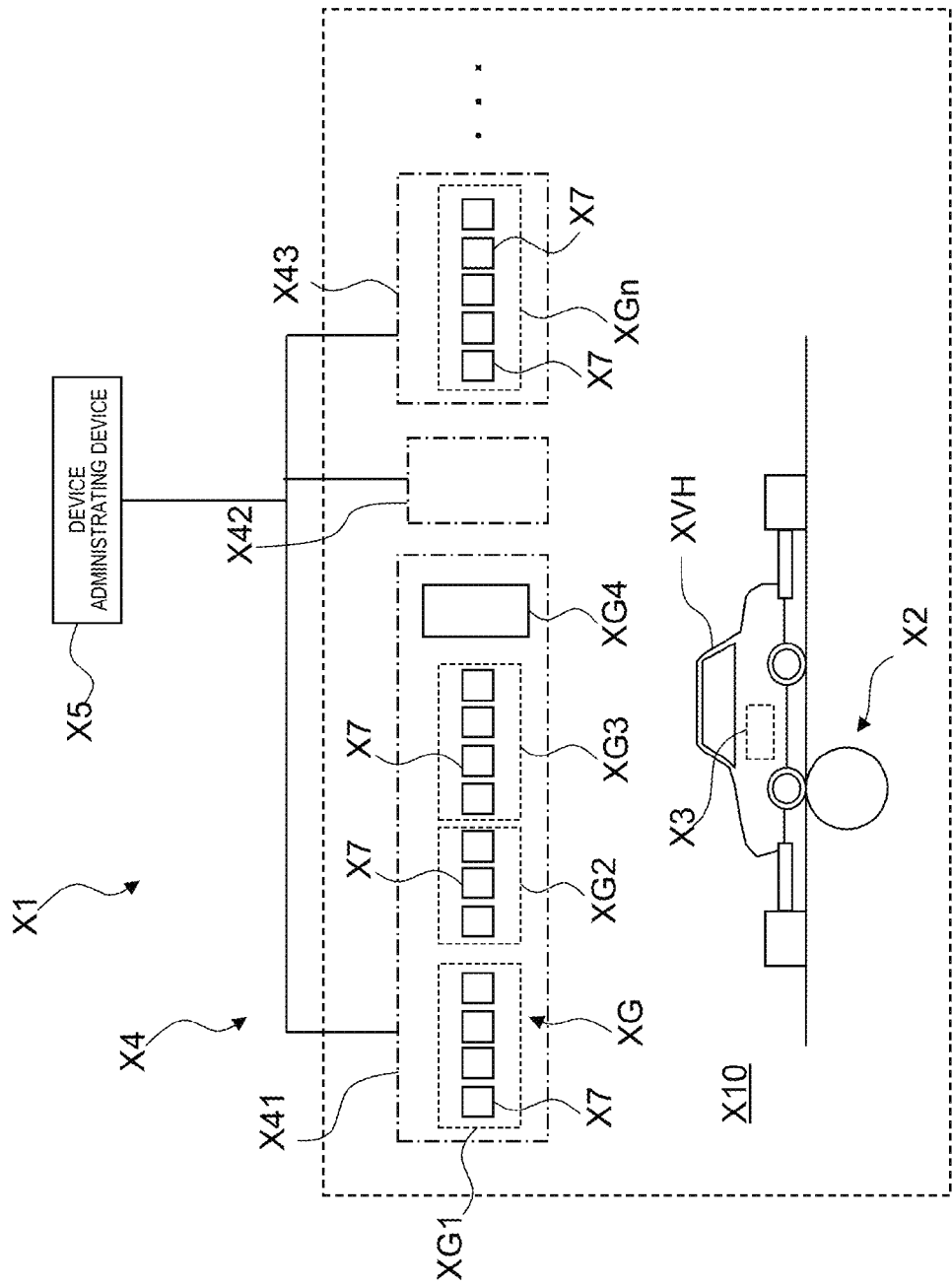
FIG. 9 is a pattern configuration diagram of a vehicle performance test system in accordance with a second embodiment of this invention.

FIG. 9 schematically shows an overall of a vehicle performance test system in accordance with this embodiment. The vehicle performance test system X1 comprises, as shown in FIG. 9, a chassis dynamometer X2, an automatic driving device X3, a plurality of devices for test (devices for measuring exhaust gas) X4, and a device administrating device X5. The vehicle performance test system X1 makes a vehicle in a pseudo driving state on the chassis dynamometer X2 and the vehicle performance in accordance with a mileage and an exhaust gas component of the vehicle can be tested. The test system X1 can be applied also to a test conducted on an engine alone.

Each part will be explained.

The chassis dynamometer X2 is so configured to make the vehicle (XVH) in the pseudo driving state similar to an actual driving state by working with the automatic driving device X3.

The automatic driving device X3 is loaded on a driving room of the vehicle (XVH) to operate an accelerator, a brake and a clutch, and makes it possible to automatically drive the vehicle (XVH) in one or a plurality of driving modes such as a 10 mode or an LA mode.

As the device for measurement X4 (hereinafter also called just as a device for measurement X4) prepared is a device for measuring, for example, HC, $NO_x$, CO, $CO_2$ in an exhaust gas flowing in an exhaust gas path of an internal combustion engine or a device to conduct a preprocessing for measuring an exhaust gas component such as CVS. The device for measurement X4 consists of an assembly made of one or more gas analysis units X7 as being a unit device and other operating units, however, it is not limited to be physically integrated. For example, there is a case that, for example, whole of a plurality of separated arrangements is called as a single device for measurement, or a plurality of devices for measurement are housed in a single case. The gas analysis unit X7 is, for example, an FID for measuring THC, a CLD for measuring $NO_x$, or an NDIR for measuring CO or $CO_2$.

The device for measurement X4 is also set as a unit for administration in a memory part X57 of a device administrating device X5, to be described later, or in a database shared by the device for measurement X4 and the device administrating device X5. A data structure in the memory part X57 will be described in detail. A tree structured hierarchy structure data where a device hierarchy to which the device for measurement X4 belongs, in a lower level hierarchy of which a group hierarchy to which the group belongs and in a lower level hierarchy of which a unit hierarchy to which the analysis unit belongs are formed is stored in the memory part X57.

The group is specified as an assembly of one or more gas analysis units X7 that act for a common object. The common object is, for example, an analysis of a component of an exhaust gas at a predetermined sampling point in an air intake and exhaust path (XLG), or a measurement of a predetermined performance (for example, an EGR ratio, an exhaust gas flow rate or the like) of an internal combustion engine (XEG).

In this embodiment, a change operation to the memory part X57 can be conducted such that the group is promoted to the device for measurement, or the analysis unit that belongs to the group is changed. Each of the group and the device is contingent on physically being capable of acting independently in the unit of itself (for example, comprising a pump and capable of sampling the gas independently or the like).

An example of several kinds of the devices for measurement X4 is, for example, a first device for measurement X41 comprising groups for measurement XG1~XG3 consisting of a plurality of gas analysis units X7 whose measurement principle is different each other and an EGR ratio measurement device XG4, a second device for measurement X42 comprising a constant volume sampling device, and a third device for measurement X43 comprising a group for measurement (XGn) including an EGR ratio measurement device.

The device for measurement X4 has a local computer and comprises a device body part X4a that controls an operating mode (a measurement mode, a correction mode or a purge mode) or a state mode (a sleep mode or a stand-by mode) of the device for measurement X4 and a communicating part X4b that receives a command signal from the device administrating device X5 and transmits operating status status information to the device administrating device X5.

Figure 10:
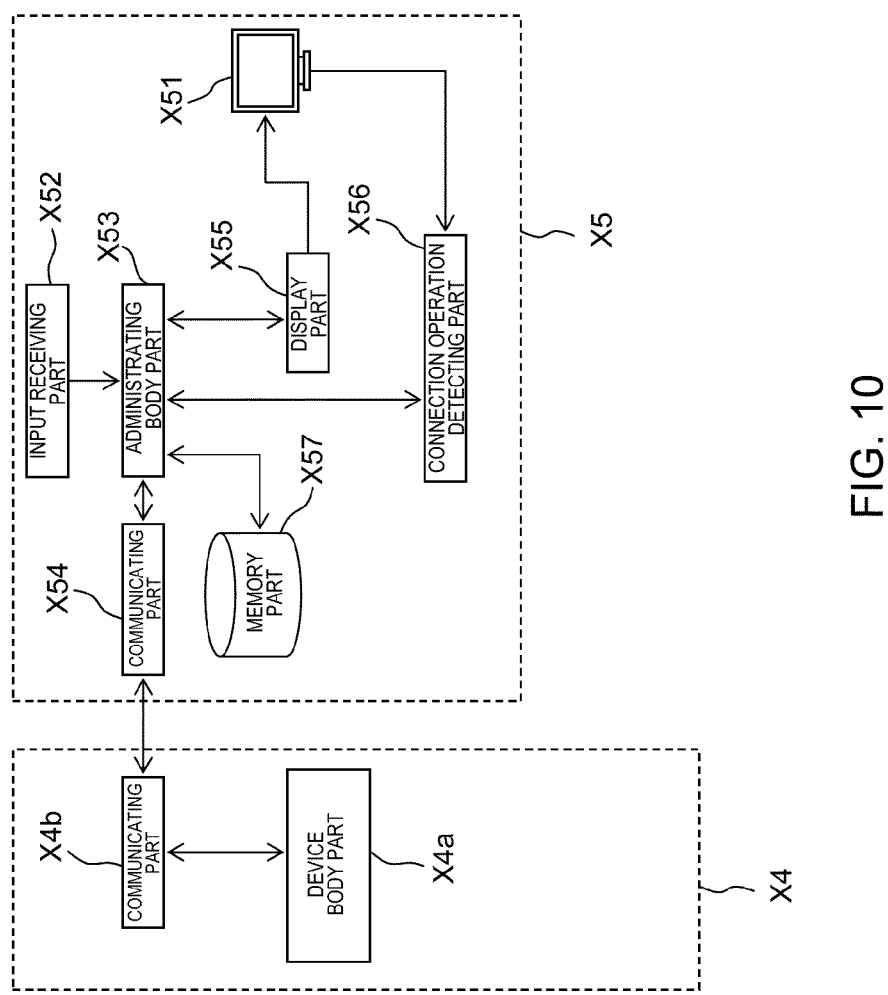
FIG. 10 is a functional block diagram of a device for measurement and a device administrating device of this embodiment.

The device administrating device X5 is configured by installing predetermined programs on, for example, a general purpose computer, and comprises a CPU, a memory, a display X51, an input receiving part X52 comprising a keyboard or a mouse and a communication interface. As shown in FIG. 10, the administrating device 7 produces functions as an administrating body part X53, a communicating part X54, an input receiving part X52, a display part X55, a connection operation detecting part X56 and a memory part X57. In addition, a communication port is provided for the device administrating device X5, and the device for measurement X4 is connected to the device administrating device X5 in an intercommunicable manner by wire or wireless.

Next, an operation centering on the device administrating device X5 will be explained.

First, an operator physically connects each of the devices for measurement X41~44 to the device administrating device X5 after various works (a pipe work or the like) concerning each of the devices for measurement X41~X44.

Figure 11:
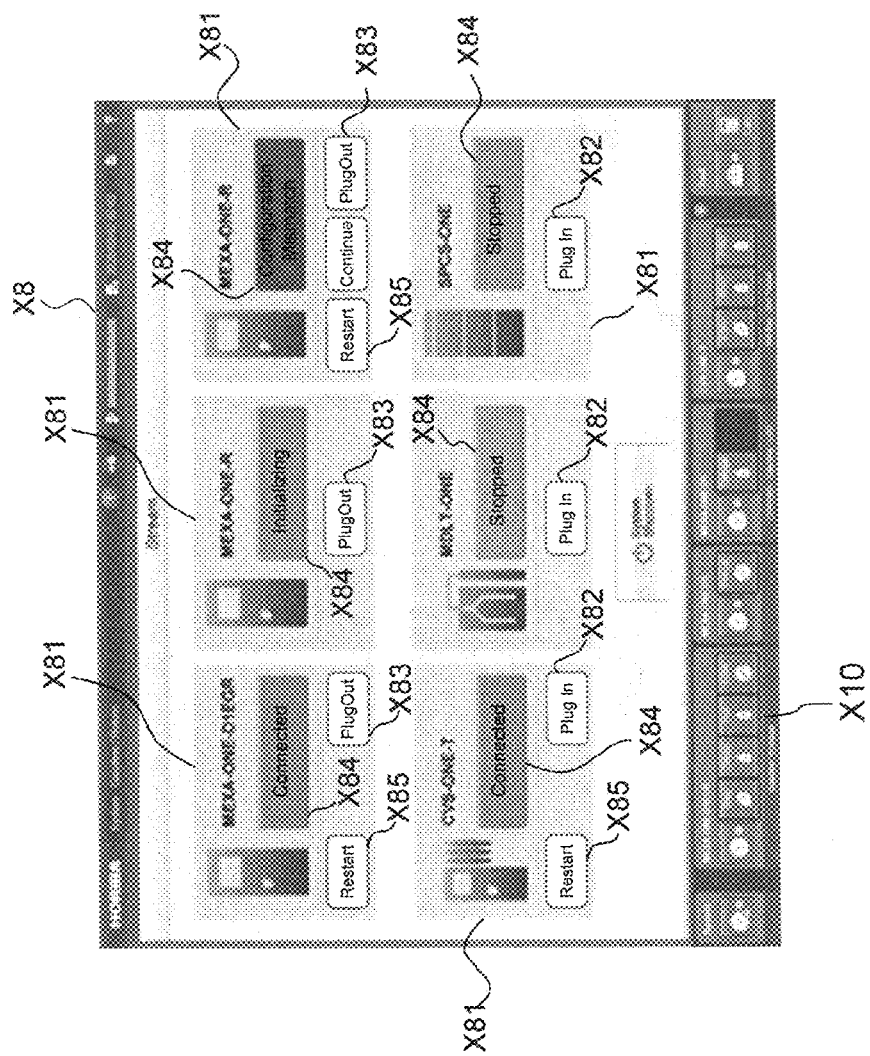
FIG. 11 is a screen configuration diagram showing a plug-in screen of this embodiment.
Figure 12:
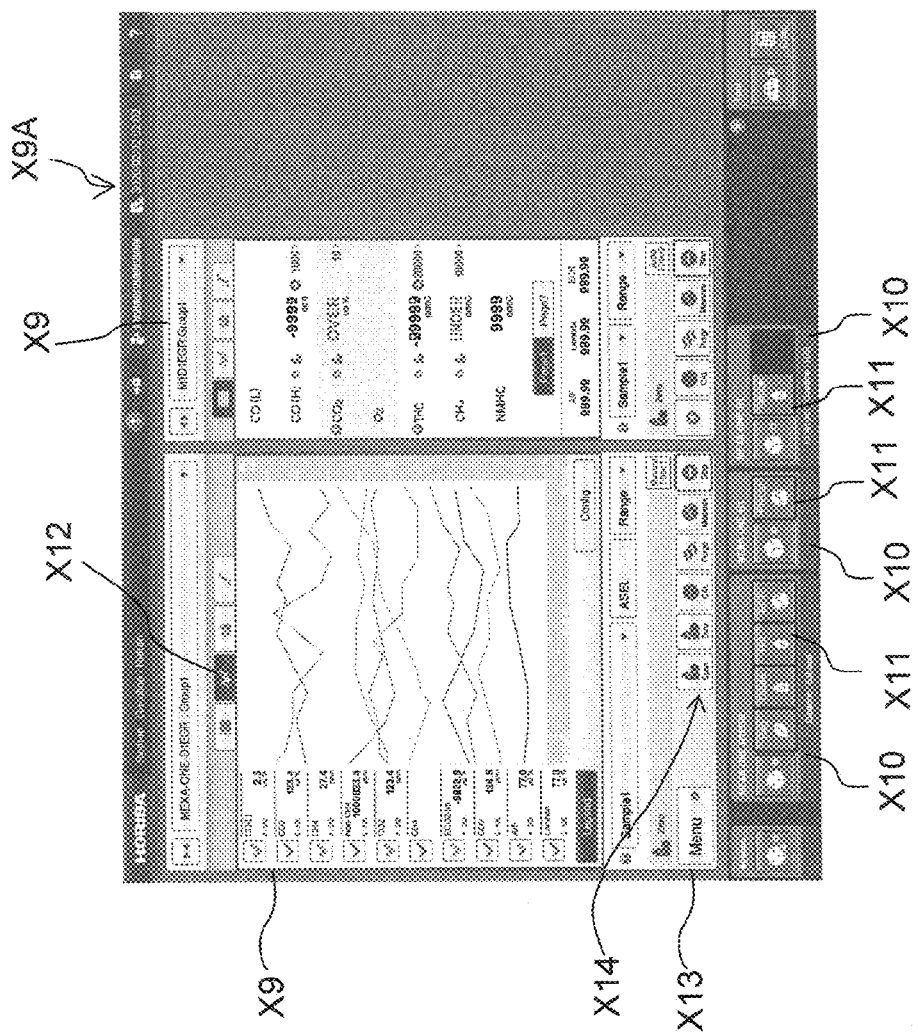
FIG. 12 is a screen configuration diagram showing a detailed information screen of this embodiment.

A screen (hereinafter also called as a plug-in screen) as shown in FIG. 11 is displayed as an initial screen on the display X51 of the device administrating device X5 by the function of the display part X55. A plurality of device signs X81 indicating the preliminary registered devices for measurement X4 are arranged so as not to be overlapped each other, and an operation status icon area X10 is arranged on the lower side of the device signs X81. A connection button X82 to be connected to the device for measurement X4, a disconnection button X83 to disconnect the connection of the device for measurement X4 and a connection state indicating area X84 to indicate a state of connection are provided for each of the device signs X81.

When the operator clicks the connection button X82, the connection operation detecting part X56 detects the click operation and a text as "Connected" indicating a state of being connected in a communicable manner is displayed in the connection state display area X84 in the pertinent device sign X81. A text as "Initializing" indicating a state of being in preparation for connection is displayed in the connection state indicating area X84 until the intercommunication is established.

Similarly, when the disconnection button X83 is clicked, the connection operation detecting part X56 detects the click operation and a text as "Stopped" indicating a state that the connection is released is displayed in the connection state display area X84.

If the connection button X82 is clicked in a state that a connector cable is disconnected or the connector cable is disconnected in the connected state, the connection operation detecting part X56 detects the disconnected state and a text as "Configuration Mismatch" indicating a state of failing connection is displayed in the connection state display area X84.

In addition, in the connected state, a reconnection button (a restart button) X85 is newly displayed. When the reconnection button X85 is clicked, the communication part X54 restarts the connection protocol and reconnects.

An inter-communicable state may be established at a time when the device for measurement X4 is physically connected to the device administrating device X5.

As mentioned, when the necessary device for measurement X4 is connected to the device administrating device X5 in a communicable manner and a predetermined operation is executed, the display part X55 displays various detailed information display screens X9A on the display X51. The detailed information display screen X9A displays the measurement data of the device for measurement X4 or varieties of information in an operating mode (a measurement mode, a correction mode, a purge mode or the like) or in a state mode (a sleep mode, a stand-by mode or the like).

In this detailed information display screen X9A, a device panel window X9 that displays the correction data or the measurement data corresponding to varieties of information output from each of the devices for measurement X41~X44 by a graph or a numerical value is displayed by the display part X55, and an operation status icon X11 is displayed in an operation status icon area X10 arranged on the lower side of the device panel window X9. The device panel window X9 can display detailed information including the measurement results input by each of the devices for measurement X41~X44 for the above-mentioned every group for measurement in a mode of a graph or a numerical value by clicking the display mode switch button X12. Switching the unit of the group for measurement is executed by selecting one of the groups for measurement displayed by a pull-down menu, not shown in drawings.

The group for measurement (XG) is recognized by the hierarchical structure data stored in the memory part X57. The hierarchical structure data is configured by positioning the device ID indicating the device for measurement X4 in the upper hierarchy, the group ID indicating the group for measurement (XG) and the unit ID indicating the gas analysis unit X7 in a descending order. Then, the administrating body part X53 displays the device panel window X9 and the operation status icon X11 by the device ID of the device for measurement X4 and the group ID of the group for measurement recognized by the memory part X57.

The operation status icon X11 is set for the group for measurement (XG) included in the lower hierarchy of the measurement device X4 in every device for measurement X4. Accordingly, for example, in case of the first device for measurement X41, the operation status icon X11 corresponding to the group for measurement XG1~XG4 is displayed by the same number as that of the group for measurement (XG) included in the lower hierarchy of the device for measurement X4. Some of the groups for measurement (XG) are previously set, however, the group for measurement (XG) may be additionally set by the operator or may be changed or deleted.

The operation status icon X11 is continuously displayed on the bottom part of the display X51 not only in a case that each device panel window X9 is displayed but also in cases that the device panel window X9 is moved by operating the input receiving part X52, that the device panel window X9 is minimized, that a certain device panel window X9 is maximized so that the other device panel window X9 is hidden by the maximized device panel window X9 and that the device panel window X9 is closed (erased).

In other words, the display part X55 displays the operation status icon X11 in preference to the display state of the device panel window X9 irrespective of the display state of the display panel window X9. Accordingly, even though both in a case that each of the devices for measurement X41~X44 is connected to the device administrating device X5 and in a case that all of the device panel windows X9 are closed, the operation status icon X11 is displayed in the operation status icon area X10.

In this case, the operation status icon is not displayed for the device for measurement X4 on which an end operation is conducted in the plug-in screen X8. In other words, for the device for measurement X4 that is physically connected with the device administrating device X5 and whose communication with the device administrating device X5 is disconnected, since no information concerning the operation status is input into the device administrating device X5, the operation status icon is not displayed.

The operation status icon X11 displays the operation status of the device for measurement X4 in every group for measurement. In this embodiment, the operation status such that the span gas is flowing, the zero gas is flowing, the exhaust gas is flowing or the inflow of the exhaust gas is temporarily halted is displayed.

Figure 13:
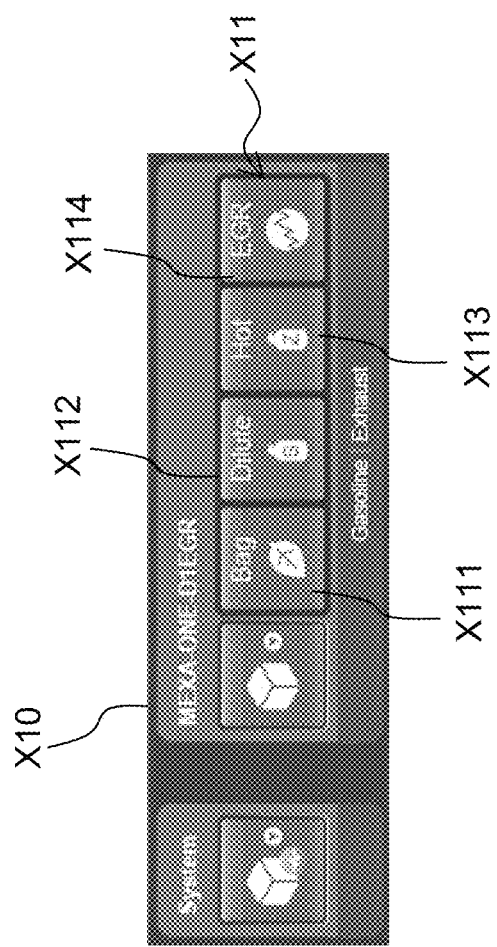
FIG. 13 is a screen configuration diagram showing an enlarged operation status icon area of this embodiment.

In this embodiment, the operation status icon X11 changes a drawing pattern in compliance with the operation status. Concretely, as shown in FIG. 13, a pose icon X111 indicating an interruption of the operation by a drawing pattern of a leaf, a span icon X112 indicating that the span gas is introducing by a drawing pattern of an alphabet "S", a zero icon X113 indicating that the zero gas is introducing by a drawing pattern of an alphabet "Z" and a measure icon indicating that the measurement is conducting by a drawing pattern of a line graph are set.

In this embodiment, it is possible to execute a movement based on the drawing pattern of the operation button X14 in every device for measurement X4 or in every displayed group for measurement by an operation of clicking the operation button X14 set in the menu bar X13 displayed on the bottom part of the device panel window X9.

Figure 14:
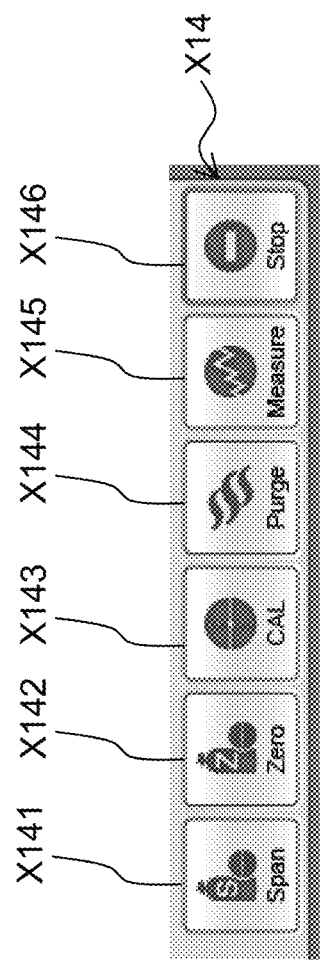
FIG. 14 is a screen configuration diagram showing a detail of an operation button of this embodiment.

More specifically, as shown in FIG. 14, when the operation button X141 indicated in "Span" is clicked, the span gas is introduced to the device for measurement X4 or the group for measurement indicated in the corresponding device panel window X9. Similarly, in case of the operation button X142 of "Zero", the zero gas is introduced. In case of the operation button X143 of "CAL", a calibration is conducted based on the measurement result of the introduced span gas and the zero gas. In case of the operation button X144 of "Purge", cleaning up the gas in the device for measurement X4 is conducted. In case of the operation button X145 of "Measure", the measurement of the sampled gas is conducted. In case of the operation button X146 of "Stop", the measurement is stopped.

As mentioned above, it is possible to conduct an intuitive operation by the operation buttons X141~X146 consisting of the icon indicating the content of the operation.

Next, a display movement of the operation status icon X11 of the device administrating device X5 will be explained. First, each of the devices for measurement X41~X44 is prepared so as to make it possible to introduce an exhaust gas necessary for measurement, and the device administrating device X5 is physically connected to each of the devices for measurement X41~44. After this, a power source of each device for measurement X41~X44 and the device administrating device X5 are powered on. Then the display part X55 displays the plug-in screen X8 on the display X51. When a start operation is executed in every device for measurement X41~X44 in the plug-in screen X8, the administrating body part X53 communicates with the device for measurement X4 on which the start operation is executed through the communicating part X54 and then the information that is necessary for displaying the operation status ion is obtained from the device for measurement X4. At this time, the display part X55 displays the operation status icon X11 corresponding to the group for measurement (XG) respectively in the operation status icon area X10 for every device for measurement X41~X44 set on the bottom part of the screen of the display X51.

After the start operation, when a predetermined operation is executed in the plug-in screen X8, the display part X55 displays the obtained detailed information of every device for measurement X41~X44 in the device panel window X9 and the operation status icon X11 corresponding to set group for measurement (XG) on the lower side of the device panel window X9. A length of the displayed operation status icon area X10 is different depending on a number of the operation status icon X11 displayed in the operation status icon area X10.

As mentioned above, in a state that the display part X55 displays the device panel window X9 of each of the devices for measurement X41~X44, when the device panel window X9 of, for example, the first device for measurement X41 is maximized, other device panel window X9 is hidden by the device panel window of the first device for measurement X41, however, the display part X55 displays preferentially each operation status icon area X10, namely the operation status icon X11 without being hidden by the maximized device panel window X9.

Meanwhile, after starting the measurement and returning to the plug-in screen X8, when the connection of a certain device for measurement X4 is released, namely the disconnection button X83 is clicked, the connection operation detecting part X56 detects that the disconnection operation is executed and the display part X55 erases the operation status icon area X10 corresponding to the device for measurement X4 and displays no operation status icon X11.

In case that each of the operation status icons X11 is displayed, an operation when the obtained operation status information is changed will be explained.

First, the administrating body part X53 of the device administrating device X5 judges whether the operation status information output by the communication part X4b of the device for measurement X4 is changed or not in every group for measurement (XG). In case that the administrating body part X53 judges that the operation status information of this time is different from the operation status information at a previous judging time, the display part X55 changes the drawing pattern of the operation status icon X11 in accordance with the change of the operation status based on the judged result. Meanwhile, in case that the administrating body part X53 judges that the operation status information of this time is not different from the operation status information at the previous judging time, the display part X55 displays the same drawing pattern continuously.

Accordingly, since the operation status icon X11 is displayed in preference to the other display content such as the device panel window X9, it is possible to verify the operation status of the device for measurement X4 in every group for measurement (XG) irrespective of the display contents of whole of the display X51.

In addition, since the operation status information is displayed in a more simple way by the operation status icon X11 while various sorts of detailed information of the device for measurement X4 are displayed in the device panel window X9, it is possible to verify the operation status intuitively without seeking the pertinent operation status information among the operation status information displayed in the device panel window X9.

Furthermore, since the operation status icon X1 of the device for measurement X4 whose connection is released is not displayed, it is possible to quickly grasp only the operation status of the device for measurement X4 in operation.

The present claimed invention is not limited to the above-mentioned embodiment.

The display X51 may be of a touch panel type. In this case, the same operation as that of the click can be executed by making contact with the connection button X82 or the disconnection button X83 by the use of a finger or an input pen instead of the click operation in the above-mentioned embodiment.

In the above-mentioned embodiment explained is the measurement of the internal combustion engine loaded on the vehicle, however, the object to be measured may be other devices other than the vehicle, for example, a performance of an automatic shift as an object to be tested may be tested.

In addition, the object to be tested may be a ship or an airplane that is loaded with the internal combustion engine similar to the vehicle, or the internal combustion engine alone that is loaded by the ship or the airplane.

The device for test is not limited to the device for measuring the exhaust gas, and may include a device for testing the mobile object such as the ship or the airplane or the devices used for testing the devices constituting the ship or the airplane, for example, an automatic driving device such as a dynamometer or a robot. The device administrating device includes not only the device that administrates directly the device for test but also the device that administrates indirectly the device for test such as the test automatic administrating device in the above-mentioned embodiment.

In addition, it is a matter of course that the present claimed invention is not limited to the above-mentioned embodiment and may be variously modified without departing from a spirit of the invention.

Explanation Of Codes

100 . . . test system
21 . . . unit for test (analysis unit)
7 . . . administrating device
71 . . . receiving part
72 . . . display part
73 . . . administrating body part
75 . . . memory part
X1 . . . vehicle performance test system
X4 . . . device for measurement of exhaust gas
X7 . . . device administrating device
X53 . . . administrating body part
X55 . . . display part
X56 . . . connection operation detecting part
X11 . . . operation status icon
XVH . . . vehicle While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A test system to test a mobile object or a component of the mobile object, the test system comprising:
one or a plurality of units for test used for the test and an administrating device that administrates the unit for test, wherein
the administrating device comprises a recognizing module that recognizes an assembly of one or more units for test as a group for test and an administrating body module that conducts a predetermined batch operation command or a predetermined batch setting on the group for test.

2. The test system described in claim 1, wherein
the recognizing module recognizes an assembly of one or more groups for test as a device for test, and
the administrating body module conducts the predetermined batch operation command or the predetermined batch setting on the unit for test that belongs to one or more designated devices for test.

3. The test system described in claim 2, wherein
the predetermined batch operation command or the predetermined batch setting is conducted on some of the groups for test or the units for test that belong to the device for test.

4. The test system described in claim 2, wherein
the recognizing module comprises a memory that stores hierarchical structure data where a device ID to identify the device for test locates in an upper hierarchy, and a group ID to identify the group for test and a unit ID to identify the unit for test are positioned in this order in a lower hierarchy than that of the device ID.

5. The test system described in claim 4, wherein
the administrating device further comprises a receiving module that receives addition, change or deletion of the group for test or the device for test, and that reflects the addition, change or deletion in the memory.

6. The test system described in claim 5, wherein
the receiving module also receives a change from a predetermined unit for test to the device for test, or a change from a predetermined device for test to the unit for test.

7. The test system described in claim 1, wherein
the predetermined batch operation command or the predetermined batch setting is conducted on some of the units for test that belong to the group for test.

8. The test system described in claim 1, wherein
a plurality of administrating body modules are connected in a communicable manner, and further comprising
a communicating module that transmits a content of the predetermined batch operation command or a content of the predetermined batch setting of one of the administrating body modules to the other administrating body module.

9. The test system described in claim 1, wherein
the unit for test is a unit for measurement used for measuring a gas flowing in an air intake and exhaust path of an internal combustion engine.

10. The test system described in claim 9, wherein
an assembly of the units for measurement to measure the gas at a predetermined sampling point arranged on the air intake and exhaust path is recognized as the group for test.

11. The test system described in claim 9, wherein
the predetermined batch operation command includes at least one of a measurement operation, a correction operation and a purge operation.

12. The test system described in claim 9, wherein
the predetermined batch setting includes setting of a span gas concentration.

13. The test system described in claim 1, wherein
the administrating device has a display module that obtains information output by the unit for test and that displays the obtained information in an erasable manner, a switchable manner or a movable manner on a display, and
the display module preferentially displays an operation status icon whose mode changes in accordance with the operation status of the unit for test irrespective of the display of the information.

14. The test system described in claim 13, wherein the administrating device further comprises a connection operation detecting module that detects that a connection or disconnection operation to connect or disconnect the unit for test is conducted, and an operation status icon is not displayed for the unit for test for which the disconnection operation is detected by the connection operation detecting module.

15. The test system described in claim 13, wherein the unit for test is a device for measurement used for measuring an exhaust gas of an internal combustion engine.

16. The test system described in claim 15, wherein the device for measurement is arranged in an exhaust gas path of the internal combustion engine and measures the exhaust gas flowing in the exhaust gas path.

* * * * *